United States Patent
Pajewski et al.

(10) Patent No.: US 8,337,111 B2
(45) Date of Patent: Dec. 25, 2012

(54) AXIAL RETENTION ASSEMBLY

(75) Inventors: Russell M. Pajewski, Farmington Hills, MI (US); Robert Neil Paciotti, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 12/633,524

(22) Filed: Dec. 8, 2009

(65) Prior Publication Data

US 2011/0135382 A1    Jun. 9, 2011

(51) Int. Cl.
    *F16D 1/06*      (2006.01)

(52) U.S. Cl. .................................. 403/316; 403/DIG. 7

(58) Field of Classification Search .................. 403/202, 403/203, 315–316, 319; 411/353, 517; 384/903
See application file for complete search history.

(56) References Cited

U.S. PATENT DOCUMENTS

| | | | | |
|---|---|---|---|---|
| 3,439,944 A | * | 4/1969 | Leutenegger | 285/321 |
| 3,822,953 A | * | 7/1974 | Adelizzi | 403/356 |
| 4,182,579 A | * | 1/1980 | McCormick et al. | 403/326 |
| 4,256,010 A | * | 3/1981 | Petrie | 411/518 |
| 4,343,581 A | * | 8/1982 | Millheiser | 411/517 |
| 5,376,049 A | * | 12/1994 | Welschof et al. | 464/111 |
| 5,746,517 A | * | 5/1998 | Durham et al. | 384/538 |
| 6,390,925 B1 | * | 5/2002 | Perrow | 464/111 |
| 6,821,207 B2 | * | 11/2004 | Bommarito et al. | 464/130 |
| 7,396,283 B2 | * | 7/2008 | Perrow et al. | 464/111 |
| 7,635,306 B2 | * | 12/2009 | Ando et al. | 464/111 |
| 2010/0303584 A1 | * | 12/2010 | Van Der Veen et al. | 411/517 |

FOREIGN PATENT DOCUMENTS

DE      10353886 B3   *   2/2005

* cited by examiner

*Primary Examiner* — Joshua Kennedy

(57) ABSTRACT

An axial retention assembly for axially retaining a retained member includes a retaining member and a retaining ring. The retaining member has a surface and an annular groove disposed on the surface, where the surface defines a cavity and the annular groove has a groove surface and an edge surface disposed between the surface and the groove surface. The retaining ring has a first portion at least partially disposed in the groove and opposing the groove surface, a second portion at least partially disposed in the cavity and opposing the retained member and the surface of the retaining member, and a recess portion disposed between the first portion and the second portion and opposing the edge surface. The recessed portion of the retaining ring does not contact the edge surface of the retaining member when the retained member exerts a predetermined force on the second portion of the retaining ring.

15 Claims, 2 Drawing Sheets

AXIAL RETENTION ASSEMBLY

TECHNICAL FIELD

The present invention relates to axial retention assemblies, and more specifically to axial retention assemblies that include retaining rings.

BACKGROUND

The statements in this section merely provide background information related to the present invention and may or may not constitute prior art.

Automatic transmissions typically include various components that are restricted from movement in certain directions while allowing movement in other directions. For example, typical transmissions include rotational bearings that allow the relative rotation between two components. But, these bearings are preferably prevented from moving in an axial direction. One method of preventing the axial movement of a bearing relative to a housing or other component includes the use of a retainer or snap ring disposed in a groove that prevents the bearing from axially moving within the housing.

These snap rings are rectangular in cross-section. When the bearing is in operation it may move in an axial direction and contact the snap ring and press the snap ring against an edge of the groove. In addition, the bearing may cause the snap ring to rotate within the groove. This contact may lead to deflection of the snap ring and high stress concentration on the snap ring where it contacts the edge of the groove. The deflection allows additional axial travel of the bearing and the wear may eventually lead to failure of the snap ring. Accordingly, there is a need for an improved snap ring with better wear and deflection characteristics.

SUMMARY

In an example of the present invention, an axial retention assembly for axially retaining a retained member includes a retaining member and a retaining ring. The retaining member has a surface and an annular groove disposed on the surface, wherein the surface defines a cavity and the annular groove has a groove surface and an edge surface disposed between the surface and the groove surface. The retaining ring has a first portion at least partially disposed in the groove and opposing the groove surface, a second portion at least partially disposed in the cavity and opposing the retained member and the surface of the retaining member, and a recess portion disposed between the first portion and the second portion and opposing the edge surface. The recessed portion of the retaining ring does not contact the edge surface of the retaining member when the retained member exerts a predetermined force on the second portion of the retaining ring.

In another example of the present invention, the retaining ring is a snap ring.

In yet another example of the present invention, the snap ring includes a circumferential gap.

In yet another example of the present invention, the retaining member is a gear in a vehicle transmission.

In yet another example of the present invention, the retained member is a race of a bearing in a vehicle transmission.

In yet another example of the present invention, the first portion has a cross sectional shape that is substantially a rectangle.

In yet another example of the present invention, the second portion has a cross sectional shape that is substantially a rectangle.

In yet another example of the present invention, the recessed portion includes a pair of surfaces that each extend into one of the first portion and the second portion.

In yet another example of the present invention, the pair of surfaces of the recessed portion are at an angle with respect to each other of about 30 degrees to about 45 degrees.

In yet another example of the present invention, the retaining ring has a cross section that is substantially "L" shaped.

In yet another example of the present invention, an axial retention assembly for axially retaining a retained member includes a retaining member and a retaining ring. The retaining member includes a groove and a surface that defines a substantially cylindrical cavity, wherein the surface circumscribes the retained member and the groove extends from the surface into the retaining member, and wherein an interface between the surface and the groove defines an edge surface. The retaining ring includes a first portion at least partially disposed in the groove, a second portion disposed in the cavity, and a recessed portion disposed between the first portion and the second portion opposing the edge surface of the retaining member, wherein the first portion includes a surface that opposes the groove to provide an axial resistance force in the direction of the retained member, the second portion includes a first surface that opposes the surface of the retaining member and a second surface that opposes the retained member, and the recessed portion extends from the surface of the first portion into the first portion and from the first surface of the second portion into the second portion. The retained member exerts a force on the second surface of the second portion of the retaining ring, and wherein the axial resistance force resists axial movement of the retained member in a direction towards the retaining ring.

In yet another example of the present invention, the retaining member is a drive transfer gear in the automobile transmission.

In yet another example of the present invention, a cross section of the retaining ring is substantially "L" shaped.

In yet another example of the present invention, the force on the retaining ring transfers to the retaining member and is at least partially distributed between the first portion and the second portion of the retaining ring.

In yet another example of the present invention, the recessed portion includes a pair of surfaces that are at an angle with respect to each other of about 30 degrees to about 45 degrees.

In yet another example of the present invention, the retaining ring has a plurality of dimensions and a material that are selected to deflect less than a predetermined amount when the force from the retained member is less than a predetermined amount.

In yet another example of the present invention, the recess portion of the retaining ring does not contact the edge portion of the retaining member when the retaining ring deflects less than the predetermined amount.

In yet another example of the present invention, the predetermined amount of the force is a normal operating force.

Further examples, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION OF THE PREFERRED EMBODIMENTS

Figure 1:
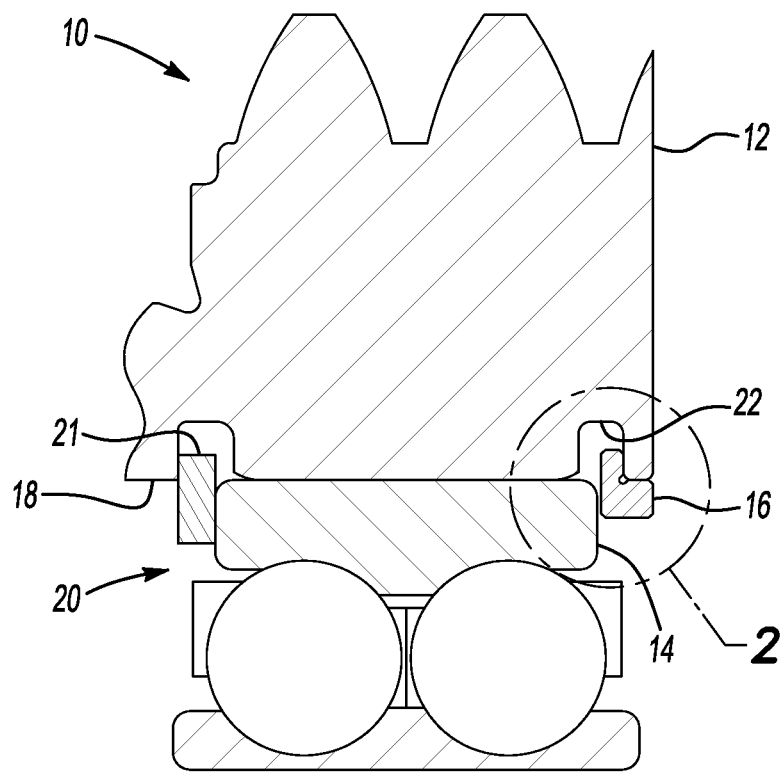
FIG. 1 is a side view of an axial retention assembly in accordance with an embodiment of the present invention.
Figure 2:
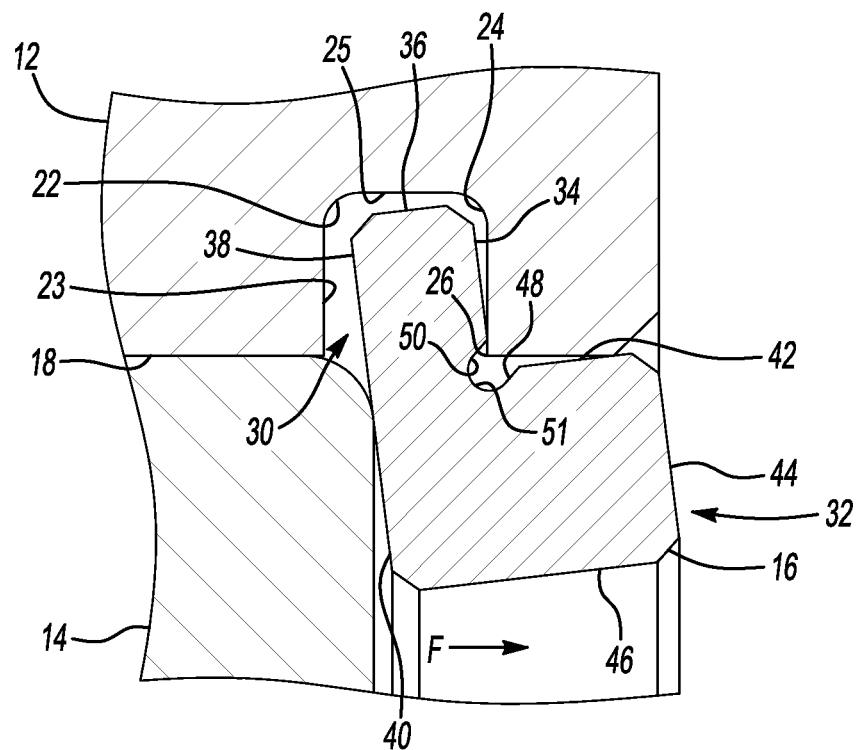
FIG. 2 is an expanded view of a portion of the axial retention assembly shown in FIG. 1 in accordance with an embodiment of the present invention.

With reference to FIGS. 1 and 2, an axial retention assembly in accordance with an embodiment of the present invention is shown in a non-engaged state (FIG. 1) and an engaged state (FIG. 2) and is generally indicated by reference number 10. The axial retention assembly 10 includes a retaining member 12, a retained member 14, and a retaining ring 16. The retaining member 12 includes a first surface 18 that defines a generally cylindrical cavity 20. The retained member 14 is nested within the cylindrical cavity 20. In the example provided, the retaining member 12 is a transfer drive gear in a vehicle transmission and the retained member 14 is an outer race of a double row ball bearing assembly. But the retaining member 12 and the retained member 14 may be other types of components in other locations, such as gears, shafts, and other components that are not otherwise axially fixed to each other without departing from the scope of the present invention. In the example provided, the axial retention assembly 10 includes one retaining ring 16 and one conventional snap ring 21, however in other embodiments the axial retention assembly 10 may include a retaining ring 16 on each side of the retained member 14.

A groove 22 is formed in the first surface 18 and extends into the retaining member 12 away from the cavity 20. The groove 22 is disposed along the entire inner circumference of the inner surface 18. The groove 22 has groove surfaces or side walls 23 and 24 that extend perpendicularly to a bottom surface 25 of the groove 22. The side wall 24 faces in the direction of the retained member 14 and is substantially perpendicular to the first surface 18 of the retaining member 12. The side wall 24 provides resistance to a force F imposed by the retained member 14 on the retaining ring 16. It should be appreciated that the side wall 24 may be at other orientations with respect to the first surface 18 of the retaining member 12 without departing from the scope of the present invention. An interface between the surface 18 of the retaining member 12 and the side wall 24 of the groove 22 defines an edge surface 26. In the example provided, the edge surface 26 is a 90 degree corner, however the edge surface 26 may be at other angles without departing from the scope of the present invention.

Figure 3:
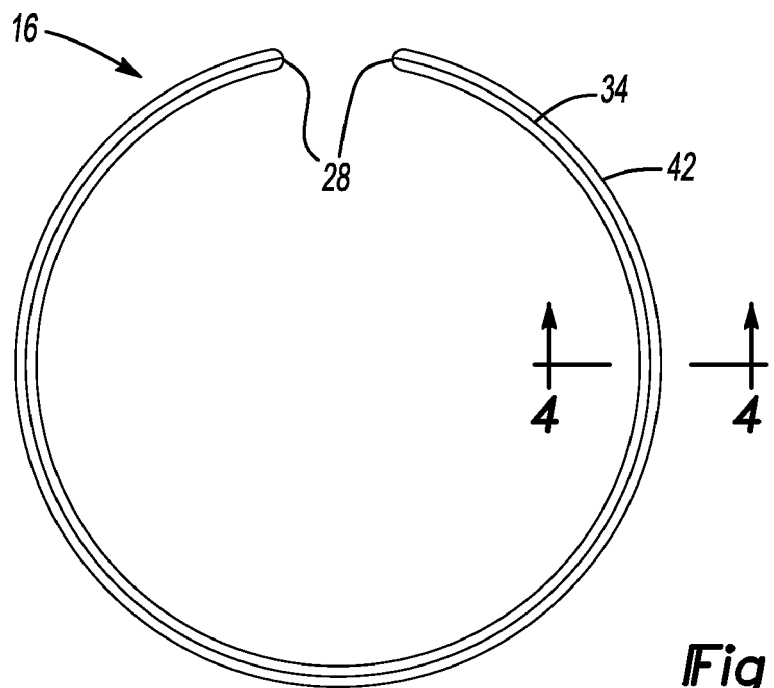
FIG. 3 is an end view of a retaining ring for use in an axial retention assembly in accordance with an embodiment of the present invention.
Figure 4:
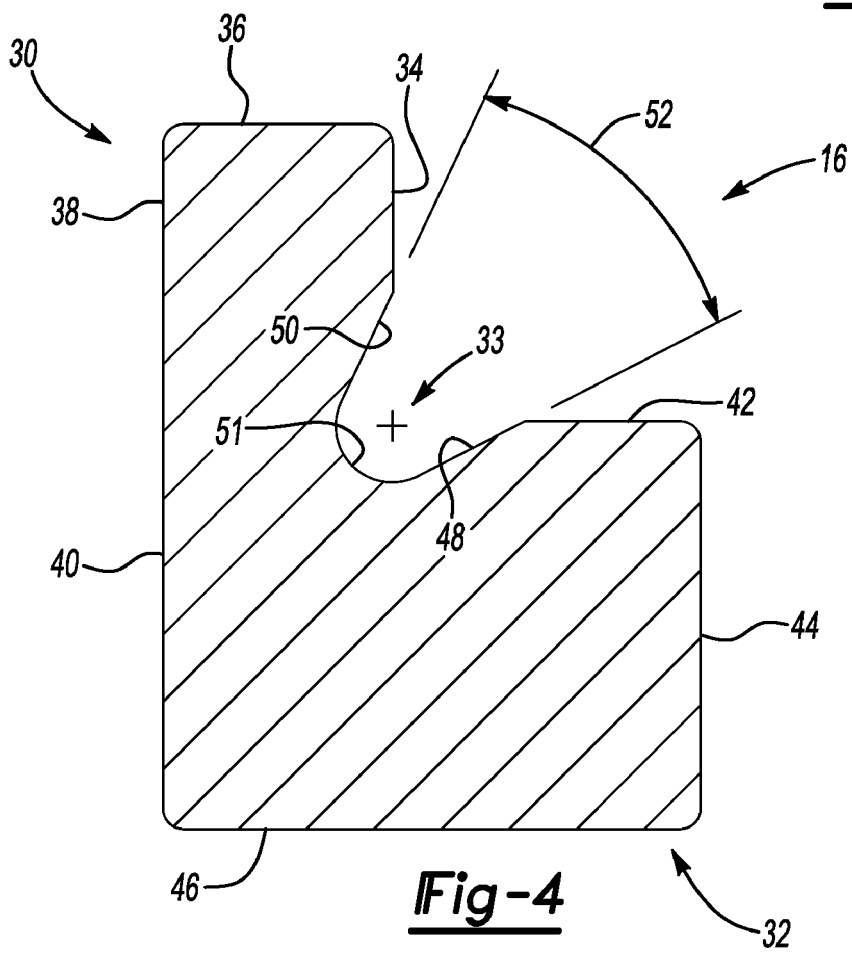
FIG. 4 is a cross-sectional view of the retaining ring shown in FIG. 2 viewed in the direction of arrow A-A in accordance with an embodiment of the present invention.

Turning to FIGS. 3 and 4, the retaining ring 16 is annular having a substantially "L" shaped cross-section and includes an annular gap portion 28. The annular gap portion 28 is a break in the annular shape of the retaining ring 16 and assists in installation of the retaining ring 16 within the groove 22 of the retaining member 12. The retaining ring 16 includes first portion 30, a second portion 32, and a recess portion 33 disposed between the first and second portions 30 and 32.

The first portion 30 is substantially rectangular in cross section and includes a first surface 34, a second surface 36 adjacent to the first surface 34, and a third surface 38 adjacent to the second surface 36.

The second portion 32 is generally rectangular in cross section and includes a first surface 40 adjacent to and planar with the third surface 38 of the first portion 30, a second surface 42 that is substantially perpendicular to the first surface 34 of the first portion 30, a third surface 44 opposite the first surface 40, and a fourth surface 46 disposed between the first surface 40 and the third surface 44.

The recess portion 33 is defined by a first surface 48 and a second surface 50 that each connects with a rounded end surface 51 having a radius of curvature. The first surface 48 extends from the second surface 42 into the second portion 32 towards the fourth surface 46. The second surface 50 extends from the first surface 34 into the first portion 30 towards the first surface 40. In the example provided, the first surface 48 and the second surface 50 are at an angle with respect to one another, indicated by reference number 52. In the example provided, the angle is approximately 38 degrees, however the angle 52 may have different values in alternative embodiments Referring back now to FIG. 2, when the retaining ring 16 is employed in the axial retention assembly 10, the first portion 30 is disposed within the groove such that the first surface 34 opposes the side wall 24 of the groove 22, the second surface 36 opposes the bottom surface 25 of the groove 22, and the third surface 38 opposes the side wall 23 of the groove 22 that is adjacent to the retained member 14. The second portion 32 is disposed adjacent the outer surface 18 of the retaining member 12 and the retained member 14 such that the first surface 40 opposes the retained member 14 and the second surface 42 opposes the surface 18 of the retaining member 12. The recess portion 33 opposes the edge surface 26.

The dimensions and the material of the retaining ring 16 are selected so that the retaining ring 16 deflects less than a predetermined amount when the force F is applied to the retaining ring 16 and is less than a predetermined amount corresponding to normal operation of the axial retention assembly 10. In the example provided, the angle 52 and the lengths of the surfaces 48, 50 are predetermined to avoid contact between the recess portion 33 and the edge surface 26 of the retaining member 12 when the retaining ring 16 deflects the predetermined amount. However, the recess portion 33 may be designed to allow some contact between the recess portion 33 and the edge surface 26 of the retaining member 12 without departing from the scope of the present invention.

During operation of the vehicle transmission, the retained member 14 may move axially and come in contact with the retaining ring 16. The retained member 14 exerts the axial force F on the second surface 36 of the second portion 32 of the retaining ring 16. At least a portion of the force F from the retained member 14 transfers through the retaining ring 16 to the first surface 34 of the first portion 30 of the retaining ring 16. The first surface 34 of the retaining ring 16 transmits the portion of the force F to the side wall 24. The side wall 24 exerts a reaction force on the first surface 34 of the first portion 30 of the retaining ring 16. The reaction force between the side wall 24 and the first surface 34 of the first portion 30 also causes a first circumferential friction force. The force from the retained member 14 may deform the retaining ring 16 and urge the second surface 42 of the second portion 32 of the retaining ring 16 against the surface 18 of the retaining member 12, causing a second circumferential friction force and an axial friction force. The first and second circumferential friction forces combine to resist rotation of the retaining ring 16 within the groove 22. The reaction force between the side wall 24 and the first surface 34 combines with the axial friction force between the surface 18 and the second surface 42 to resist axial movement of the retained member 14 in the direction of the force F. The retaining ring 16 deflects, however the recessed portion 33 of the retaining ring 16 has limited, if any, contact with the edge surface 26 when the force F is less than the predetermined amount.

The present invention provides an axial retention assembly with advantages over the prior art. More specifically, the present invention provides an axial retention assembly with beneficial axial deflection and wear characteristics.

The description of the invention is merely exemplary in nature and variations that do not depart from the gist of the invention are intended to be within the scope of the invention. Such variations are not to be regarded as a departure from the spirit and scope of the invention.

What is claimed is:

1. An axial retention assembly for axially retaining a retained member, the axial retention assembly comprising:
    a retaining member having a surface and an annular groove disposed on the surface, wherein the surface defines a cylindrically shaped cavity and the annular groove has a groove surface and an edge surface disposed between the surface and the groove surface, and wherein the groove surface is substantially perpendicular to the surface; and
    a retaining ring having a first portion at least partially disposed in the groove and opposing the groove surface, a second portion at least partially disposed in the cavity and opposing the retained member and the surface of the retaining member, and a recess portion disposed between the first portion and the second portion and opposing the edge surface, and wherein the first portion has a first portion surface that is in contact with and is parallel with the groove surface of the annular groove and wherein the second portion has a second portion surface that is cylindrically shaped, that is perpendicular to the first portion surface, and is in contact with the surface of the retaining member, and wherein the recessed portion includes an entirely arcuate end surface and a pair of surfaces directly connected by the entirely arcuate end surface, the pair of surfaces each extend into one of the first portion and the second portion and are at an angle with respect to each other of about 30 degrees to about 45 degrees, and
    wherein the recessed portion of the retaining ring does not contact the edge surface of the retaining member when the retained member exerts a predetermined force on the second portion of the retaining ring.

2. The axial retention assembly of claim 1, wherein the retaining ring is a snap ring.

3. The axial retention assembly of claim 1, wherein the snap ring includes a circumferential gap.

4. The axial retention assembly of claim 1, wherein the retaining member is a gear in a vehicle transmission.

5. The axial retention assembly of claim 1, wherein the retained member is a race of a bearing in a vehicle transmission.

6. The axial retention assembly of claim 1, wherein the first portion has a cross sectional shape that is substantially a rectangle.

7. The axial retention assembly of claim 6, wherein the second portion has a cross sectional shape that is substantially a rectangle.

8. The axial retention assembly of claim 1, wherein the retaining ring has a cross section that is substantially "L" shaped.

9. An axial retention assembly for axially retaining a retained member, the axial retention assembly comprising:
    a gear of a vehicle transmission including a groove and a surface that defines a substantially cylindrical cavity, wherein the surface circumscribes the retained member and the groove extends from the surface into the gear, and wherein an interface between the surface and the groove defines an edge surface; and
    a retaining ring including a first portion at least partially disposed in the groove, a second portion disposed in the cavity, and a recessed portion disposed between the first portion and the second portion opposing the edge surface of the gear, wherein the first portion includes a surface that opposes the groove to provide an axial resistance force in the direction of the retained member, the second portion includes a first surface that opposes the surface of the gear and is perpendicular to the surface of the first portion, and a second surface that opposes the retained member, and the recessed portion extends from the surface of the first portion into the first portion and from the first surface of the second portion into the second portion, and wherein the first surface of the second portion is substantially cylindrically shaped and is in contact with the surface of the gear, and wherein the recessed portion includes an entirely arcuate end surface and a pair of surfaces directly connected by the entirely arcuate end surface, the pair of surfaces each extend into one of the first portion and the second portion and are at an angle with respect to each other of about 30 degrees to about 45 degrees, and
    wherein when the retained member exerts a force on the second surface of the second portion of the retaining ring, and wherein the axial resistance force resists axial movement of the retained member in a direction towards the retaining ring.

10. The axial retention assembly of claim 9, wherein the retaining ring is a snap ring.

11. The axial retention assembly of claim 10, wherein the retained member is a race of a bearing and the gear is a drive transfer gear in the automobile transmission.

12. The axial retention assembly of claim 9, wherein the first portion and the second portion have cross sectional shapes that are substantially rectangular.

13. The axial retention assembly of claim 9, wherein a cross section of the retaining ring is substantially "L" shaped.

14. The axial retention assembly of claim 13, wherein and the force on the retaining ring transfers to the gear and is at least partially distributed between the first portion and the second portion of the retaining ring.

15. The axial retention assembly of claim 9, wherein the retaining ring has an elastic characteristic such that the recess portion of the retaining ring does not contact the edge portion of the gear when the retaining ring deflects in response to an operating force from the retained member.

* * * * *